United States Patent
De Bruijn et al.

(10) Patent No.: US 9,766,120 B2
(45) Date of Patent: Sep. 19, 2017

(54) DETECTING LIGHT

(71) Applicant: PHILIPS LIGHTING HOLDING B.V., Eindhoven (NL)

(72) Inventors: Frederik Jan De Bruijn, Eindhoven (NL); Onno Martin Janssen, Geldrop (NL); Lorenzo Feri, Eindhoven (NL); Tommaso Gritti, Breda (NL); Stephanus Joseph Johannes Nijssen, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/907,702

(22) PCT Filed: Jul. 17, 2014

(86) PCT No.: PCT/EP2014/065399
§ 371 (c)(1),
(2) Date: Jan. 26, 2016

(87) PCT Pub. No.: WO2015/018622
PCT Pub. Date: Feb. 12, 2015

(65) Prior Publication Data
US 2016/0161329 A1    Jun. 9, 2016

(30) Foreign Application Priority Data

Aug. 8, 2013    (EP) .................. 13179668

(51) Int. Cl.
*G01J 1/02*    (2006.01)
*G01J 1/44*    (2006.01)
(Continued)

(52) U.S. Cl.
CPC ............... *G01J 1/0238* (2013.01); *G01J 1/44* (2013.01); *H04R 1/1033* (2013.01); *H04R 23/008* (2013.01); *H05B 37/0272* (2013.01)

(58) Field of Classification Search
CPC ...... G01J 1/0238; G01J 1/44; H05B 37/0272; H04R 1/1033; H04R 23/008
See application file for complete search history.

(56) References Cited

U.S. PATENT DOCUMENTS

| 6,262,958 B1 | 7/2001 | Ogihara et al. |
| 2006/0148314 A1* | 7/2006 | Castaneda ............ H01R 9/091 439/581 |

(Continued)

FOREIGN PATENT DOCUMENTS

| EP | 2273188 A2 | 12/2011 |
| EP | 2418830 A1 | 2/2012 |

(Continued)

OTHER PUBLICATIONS

Apple Support: "Mac OS X 10.6: Identifying Audio Ports," Last Modified Aug. 6, 2013, http://support.apple.com/KB/PH7308, Last Visited on Jan. 26, 2016 (2 Pages).

Primary Examiner — David Porta
Assistant Examiner — Mindy Vu
(74) Attorney, Agent, or Firm — Meenakshy Chakravorty

(57) ABSTRACT

The present invention relates to a mobile device for detecting light. The mobile device (300) includes a photo detector (320) which is arranged at the end of a socket barrel (114) of an audio jack socket in the mobile device. The socket barrel serves to collimate the light onto the photo detector.

15 Claims, 5 Drawing Sheets

(51) Int. Cl.
*H04R 1/10* (2006.01)
*H04R 23/00* (2006.01)
*H05B 37/02* (2006.01)

(56) References Cited

U.S. PATENT DOCUMENTS

| | | |
|---|---|---|
| 2010/0146445 A1 | 6/2010 | Kraut |
| 2010/0301679 A1 | 12/2010 | Murray et al. |
| 2011/0116647 A1 | 5/2011 | Terlizzi et al. |
| 2011/0116747 A1* | 5/2011 | Terlizzi ............... G02B 6/3817 385/75 |
| 2011/0300751 A1 | 12/2011 | Wittenberg et al. |
| 2013/0012055 A1 | 1/2013 | Stenmark et al. |
| 2013/0121648 A1* | 5/2013 | Hung ................ G02B 6/4293 385/79 |

FOREIGN PATENT DOCUMENTS

| | | |
|---|---|---|
| EP | 2503852 A1 | 9/2012 |
| WO | 2012127439 A1 | 9/2012 |
| WO | 2015018622 A2 | 2/2015 |

\* cited by examiner

US 9,766,120 B2

DETECTING LIGHT

CROSS-REFERENCE TO PRIOR APPLICATIONS

This application is the U.S. National Phase application under 35 U.S.C. §371 of International Application No. PCT/EP2014/065399, filed on Jul. 17, 2014, which claims the benefit of European Patent Application No. 13179668.2, filed on Aug. 8, 2013. These applications are hereby incorporated by reference herein.

FIELD OF THE INVENTION

The present invention relates to a mobile device arranged to detect light emitted from a light source.

BACKGROUND OF THE INVENTION

Light detection is required in numerous scenarios. In one particular context, coded light emitted from a light source is to be detected. Light detectors arranged to detect coded light emitted from a light source are typically based on the use of a single photo detector, typically a photodiode, to capture the light and convert it into an electrical signal to be further processed.

Recently, coded light detection has been enabled in smartphones by using any of its native light sensitive sensors i.e., the ambient light sensors for display brightness adaptation or proximity sensing as well as with its camera or cameras. Point sensors are typically on the front of the device, facing the user. Back and front facing cameras are typically oriented perpendicular to the plane of the device. For example, reference is made to WO 2012/127439.

SUMMARY OF THE INVENTION

The inventors have recognized that the current location of the native light sensitive sensors on a smartphone limit the possible applications for the light detector, and in particular limit its functionality as a point and control device. The inventors have recognized that existing point and control devices such as infrared remote controls have their light sensitive sensors on the top edge of the device. The inventors thus provide in the following a mobile device, for example, a smartphone, with the ability to detect light from the top edge of the device such that it enables the device to act like a remote control in a point and control action. Having developed such a device, other light detection scenarios become possible as discussed in the following.

One aspect of the invention provides a mobile device for detecting light from a light source external to the mobile device the mobile device having a housing which houses: an audio jack socket configured to receive an audio output component for providing an audio signal generated in the mobile device to a user through an audio jack plug inserted in the audio jack socket; a photo detector arranged in the audio jack socket to detect light when the audio jack socket is not connected to an audio jack plug, whereby the audio jack socket acts to collimate received light from the external light source to be sensed by the photo detector; and a processor arranged to process a signal received from the photo detector and to generate therefrom a function control signal for controlling a function in dependence on the received light.

The invention advantageously enables an existing socket of a mobile device, such as a smartphone, to be used to collimate received light. "Point and control" requires angular sensitivity, which can be provided by placement of the photo detector on the axis of the socket barrel at a certain distance from the surface. When enabled to act as a "point and control" device, the device also houses a transmitter for transmitting the function control signal to an external device. For example, where the detected light is coded to identify a light source, the control signal can control operation of the identified light source.

This advantageously enables the mobile device to act like a remote control in a point and control action.

Alternatively, the mobile device could act as a luminance meter, where the detected light represents ambient luminance levels. The luminance levels could be displayed on a display screen of the mobile device through the function control signal.

Preferably the mobile device is configured to detect visible light, although the invention is not restricted to this. A mobile device configured to detect (e.g.) infrared light is also envisaged.

The photo detector may comprise one or more a photo diodes.

For a better understanding of the present invention to show how the same may be carried into effect reference will now be made to the following drawings.

DETAILED DESCRIPTION OF PREFERRED EMBODIMENTS

Figure 1:
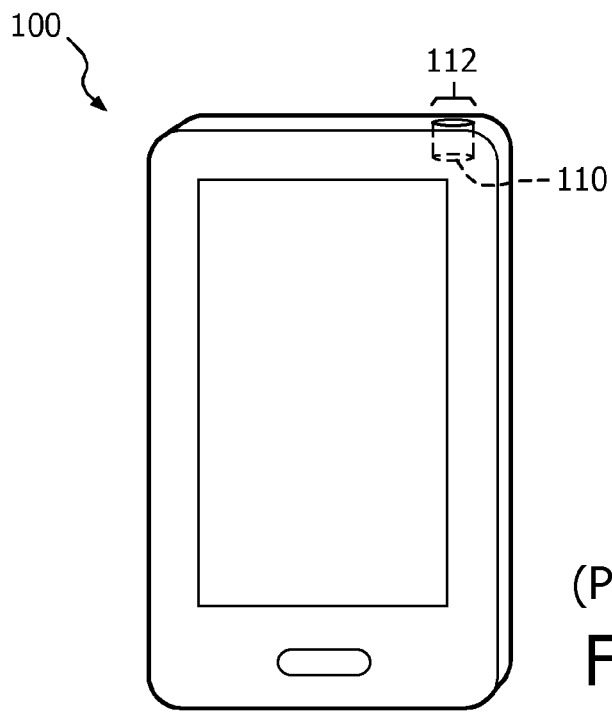
FIG. 1 is a perspective view of a mobile device.
Figure 2A:
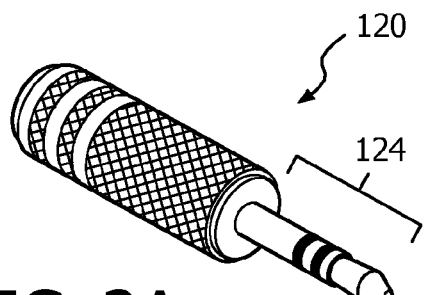
FIG. 2A shows an audio jack connector.
Figure 2B:
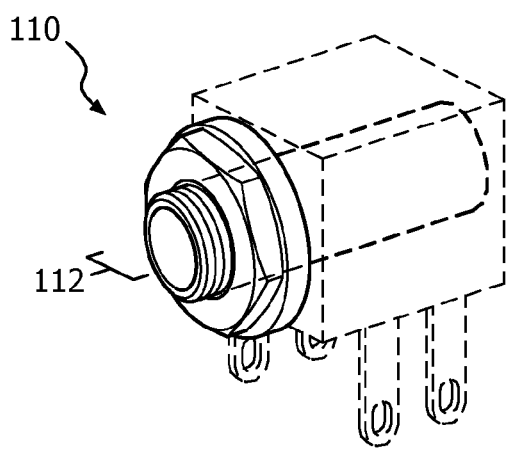
FIG. 2B shows an audio jack socket.

FIG. 1 shows a typical smartphone 100 housing a standardized (e.g. 3.5 mm) audio jack socket 110 for connecting the smartphone to external audio output devices (headphones, external speakers, etc.). A typical audio jack socket 100 is shown in more detail in FIG. 2B. External audio output devices are typically connected to socket 110 by way of a cable connected to a standardized (e.g. 3.5 mm) audio jack plug 120, shown in FIG. 2A. Other mobile computer devices such as tablets also typically house audio jack sockets. The socket 110 has a barrel 114 (see FIG. 3), adapted to received pin 124 of the plug 120. The smartphone includes audio signal generating circuits which generate an audio signal which is supplied to the socket 110. For example, a processor can generate music or a voice signal from a call by executing certain applications.

Figure 3:
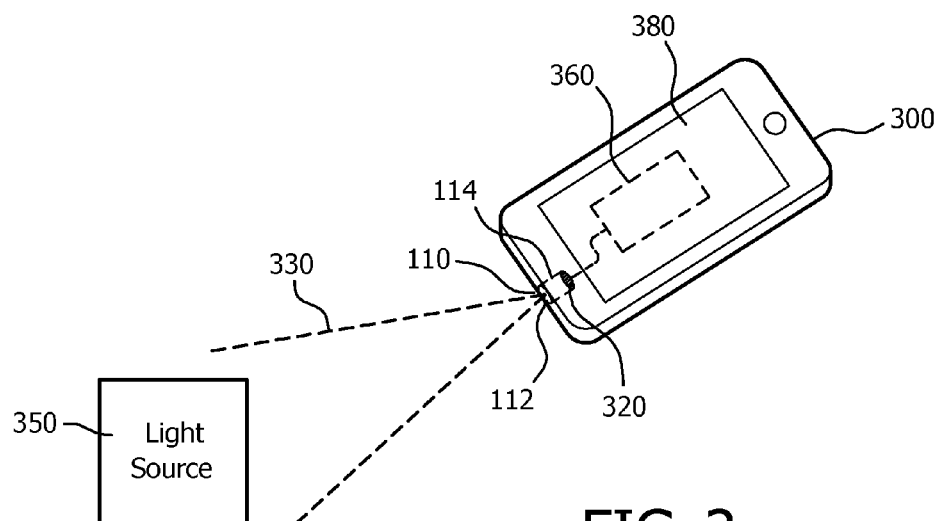
FIG. 3 illustrates the mobile device in use.

An embodiment will now be described with reference to FIG. 3. FIG. 3 shows a mobile device 300 housing a standardized audio jack socket 110 of the type shown in FIG. 1, at the top side of the device when oriented as a user device. The barrel 114 is left exposed by opening 112.

Figure 4:
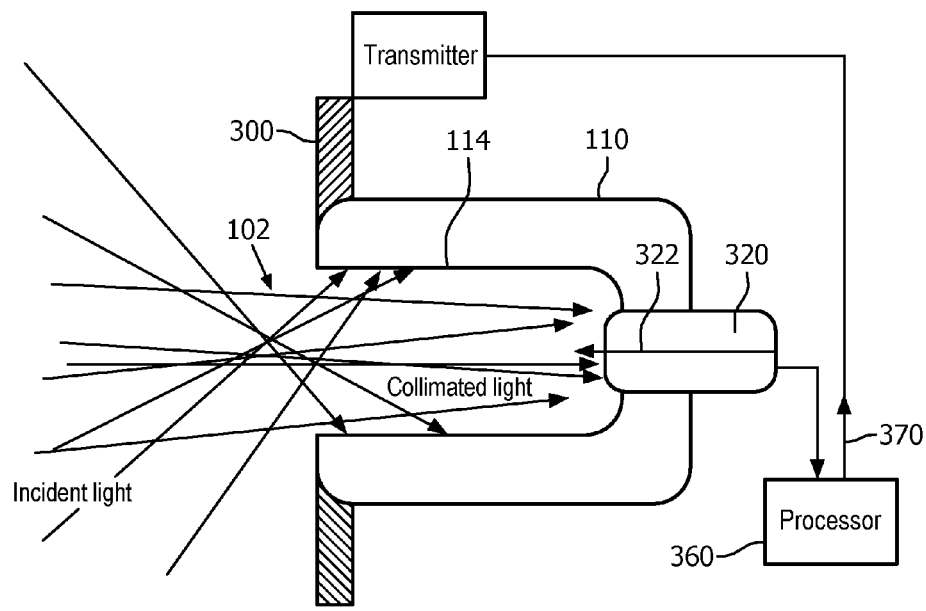
FIG. 4 is a schematic cross section through the audio jack socket.

The inventors have recognized that opening 112 and barrel 114 act in combination to collimate incident light, which is typically substantially isotropic and homogenous. That is, opening 112 acts as an optical aperture, with the barrel allowing only light which is substantially parallel to the barrel to propagate a significant distance down the barrel. The greater the length of the barrel, the greater the collimation effect. This is illustrated in FIG. 4.

The inventors have further appreciated that this collimation effect may be exploited by arranging a photo detector 320 (shown in FIGS. 3 and 4) in the audio jack socket 110 to detect light collimated by the audio jack socket as described above. Barrel 114 has an axis 322, on which the photo detector 320 is arranged at a suitable distance (herein referred to as "depth") from the opening 112.

The photo detector 320 is operatively coupled to a processor 360, also housed by the device 300. The processor 360 is arranged to process a signal received from the photo detector and to generate therefrom a function control signal 370 for controlling a function in dependence on the received light. Example functions are discussed later.

Figure 4A:
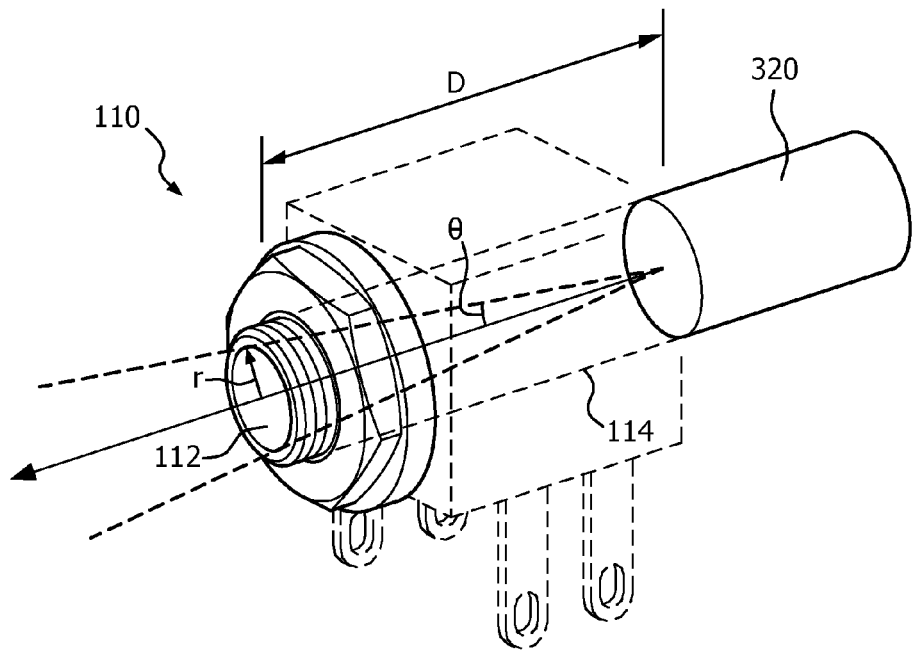
FIG. 4A is a perspective view of the audio jack socket.

As illustrated in FIG. 4A, for an opening 112 of socket 110 having a radius r and a photo detector arranged a distance D from opening 112, light incident on detector 320 (having passed though barrel 114) deviates from a direction parallel to barrel 114 by at most an angle $\theta = \arctan(r/D)$, which tends towards zero as D increases.

Figure 5:
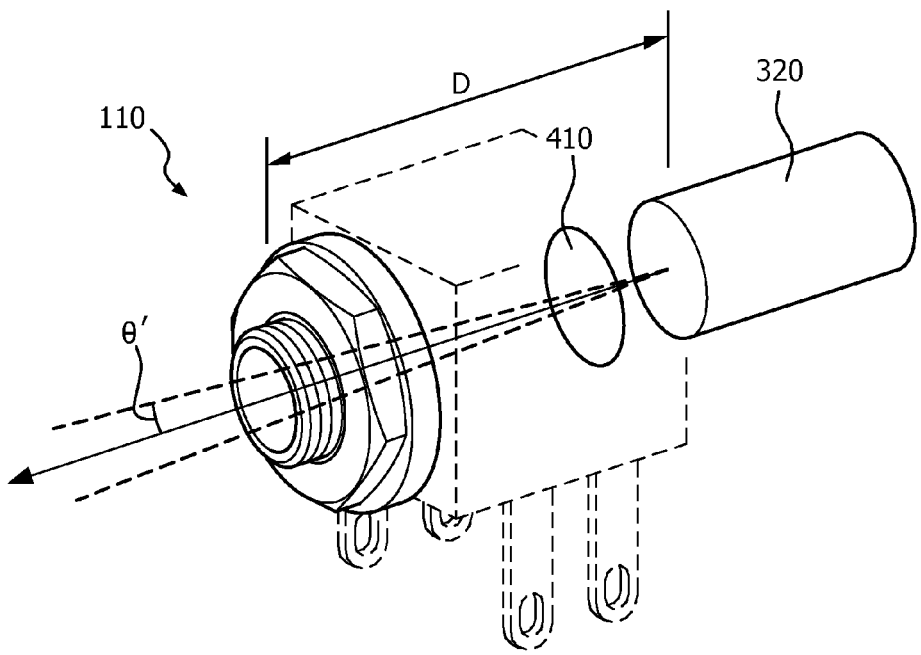
FIG. 5 is a perspective view of an alternative arrangement in an audio jack socket.

In the embodiment illustrated in FIG. 5, this angle is reduced further still to $\theta' < \theta$ by arranging auxiliary collimating optics (e.g. lens, aperture stop) in socket 320. That is, collimating optics 410 acting in combination with the natural collimating effect of socket 112 to provide a greater overall collimation effect.

A useful implementation of this is in a "point and control" scenario in which the processor 360 processes received coded light to identify a light source emitting the coded light, and the mobile device has a transmitter for transmitting the control signal 370 to the identified light source. The transmission of a control signal can be achieved using a "second" communication channel, wired or wireless. In the case of current mobile devices this second channel can be based on Wi-Fi. The control signal can be based on the processing of the coded light as discussed more fully later. Point and control requires angular selectively, which is provided by the aforementioned placement of the photo detector.

FIG. 3 depicts a typical position of device 300 during a point and control activity, with socket 112 of device 300 directed towards coded light source 350.

The transmitter may, for instance, be in the form of an (infrared) emitting light source housed by device 300 such that the device can act as a traditional (infrared) remote control, or may be in the form of a wireless radio transmitter (e.g. Bluetooth).

Similar use in the context of coded light detection for light control and installation is envisaged.

Figure 6:
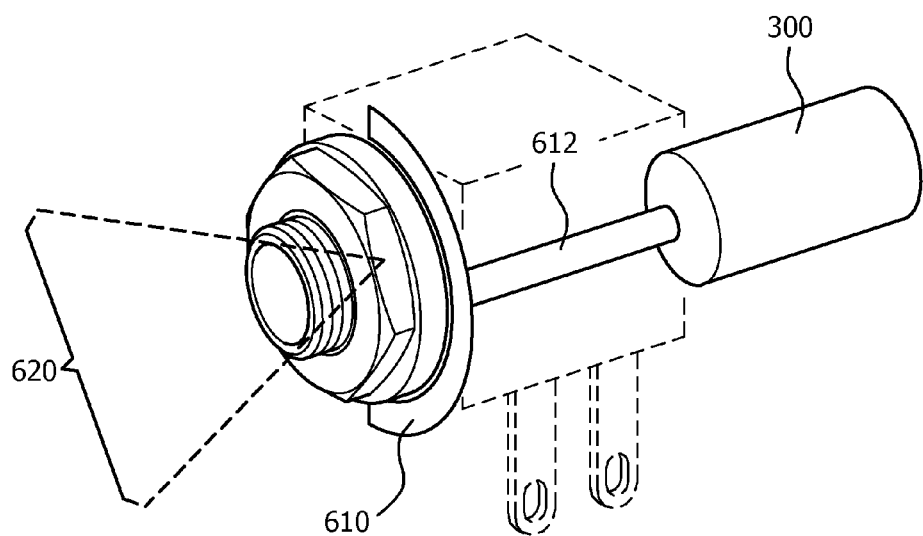
FIG. 6 illustrates a photo guide in an audio jack socket.

An alternative embodiment is shown in FIG. 6, in which an annularly disposed, e.g. circular light guide 610, is arranged in the inner circumference of the barrel. As will be appreciated, depending on the depth at which the circular guide 610 is placed, different fields of view 620 are captured. A greater depth results in a narrower field of view. Although a circular guide is shown, the subdivision of the circle in two or more segments can provide a more accurate angular measurement.

Figure 7:
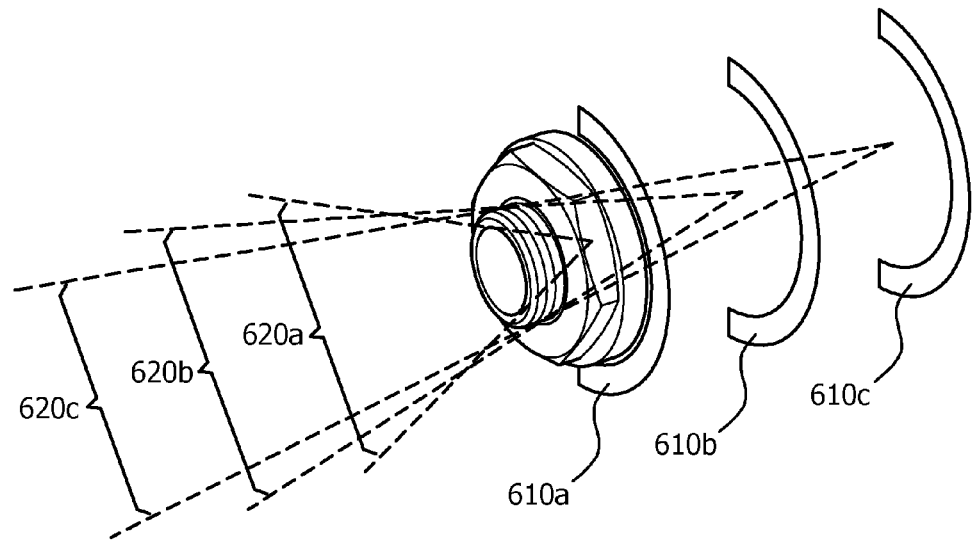
FIGS. 7 and 8 illustrate alternative embodiments of photo guides in an audio jack socket.

This property is exploited in the further embodiment illustrated in FIG. 7, in which three light guides 610a, 610b and 610c are embedded at increasing depths to simultaneously capture different overlapping field of views 620a, 620b and 620c respectively. These light guides can be circular, semi-circular or other arcuate segments.

The mechanical shape of the audio jack functions as collimator, and therefore, depending on the depth at which an optical guide is embedded, a different field of view is achieved.

In the embodiment of FIG. 7, also present are a coupling light guide and the corresponding diode detector for each of the circular light guides 610a, 610b, 610c (the detector 300 comprising the three photo diodes in this embodiment). This is not shown in FIG. 7, but as will be appreciated the arrangement for each guide is similar to that shown for a single light guide in FIG. 5. Multiple photodiodes provide angular selectivity allowing for detection of multiple light signals.

Figure 8:
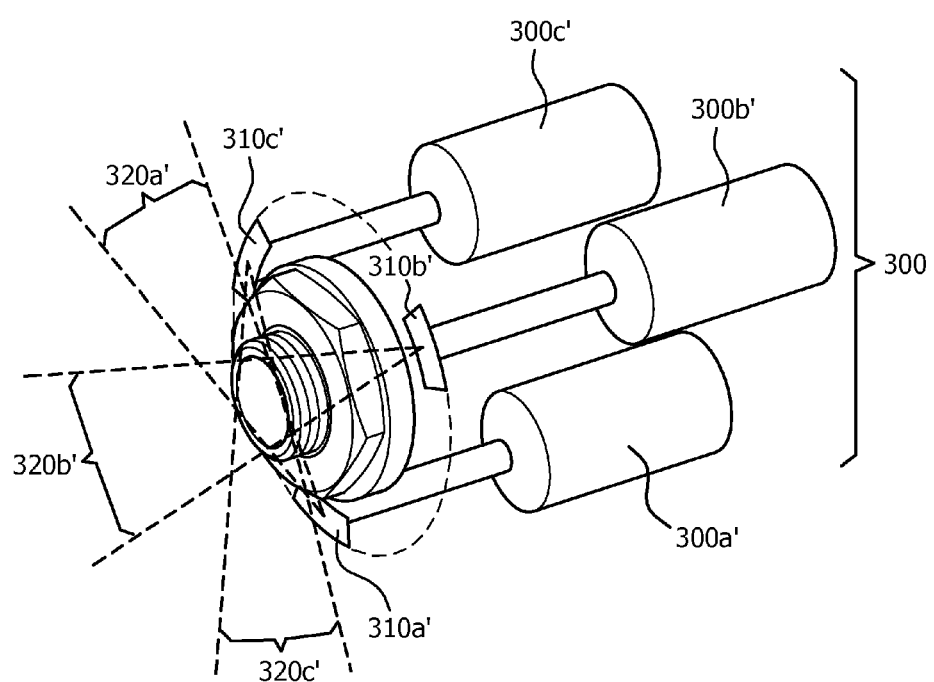

A further embodiment is shown in FIG. 8 in which three annularly disposed arcuate light guides 310a', 310b' and 310c' are positioned along the same circular section of socket 110, in order to simultaneously capture different non overlapping field of views 320a', 320b' and 320c' respectively, of them coupled with a separate respective photodiode 300a', 300b' and 300c', the photo detector 300 comprising the three photo diodes.

The extent to which each guide spans the circumference of socket 112 is intentionally restricted such that each captures an alternative field of view.

As will be appreciated, in the embodiments of FIGS. 6, 7 and 8, it is both the depth of the light guides and collimation effect due of socket 112 which act to restrict the field of view. In the embodiment of FIG. 8, it is the position of the light guides on the circumference of the socket 112 which dictate the direction of the field of view.

When used in the context of coded light, the processor 360 can incorporate a data acquisitor. The data acquisitor is arranged to acquire and store data about light sources the light of which has been decoded. That data can be displayed on a screen 380.

The light source data can be e.g. status information, control parameter information, or other type of data related to the light source or the location where the light source is installed. Here it should be noted that in some cases it is sufficient to retrieve just a unique identifier of a light source by means of the photo detector 320. Once the light source has been identified, other information about the light source, or the location of the light source can be retrieved from a database or by requesting this information from the light source using a secondary communication link, e.g. Radio Frequency communication, between the light source and the mobile device 300. The associated light source data may be presented on the screen 380.

The mobile device can be used as follows. First the user directs the device to point the audio jack socket towards a light source which the user wants to know the settings about or wants to adjust the settings of. The detected coded light transmitted from the light source is collimated by the socket barrel 114 onto the photo detector 320 and decoded by the processor 360. Once the light source has been identified, the user can perform remote control of the light source, i.e. remote adjustment of settings thereof, as currently known in the art.

In an alternative method, light received from the light source is not necessarily coded light, but is just light generated by the light source and is indicative of a luminance level. The luminance is from a particular direction due to the collimating effect of the socket. The photo detector 320 generates a signal indicative of the directional light. The processor 360 is arranged to receive and process the signal to thereby generate a luminance level which can be displayed on the screen 380.

Above embodiments of the mobile device according to the present invention as defined in the appended claims have been described. These should only be seen as merely non-limiting examples. As understood by the person skilled in the art, many further modifications and alternative embodiments are possible within the scope of the invention as defined by the appended claims.

It is to be noted that for the purposes of this application, and in particular, with regard to the appended claims, the word "comprising" does not exclude other elements or steps, and the word "a" or "an" does not exclude a plurality, which per se will be evident to a person skilled in the art.

The invention claimed is:

1. A mobile device, for sensing light output from a light source external to the mobile device, comprising:
    an audio jack socket configured to receive an audio output component for providing an audio signal generated in the mobile device to a user through an audio jack plug inserted in the audio jack socket;
    a photo detector arranged in the audio jack socket to detect said light output from the light source when the audio jack socket is not connected to any jack plug, whereby the audio jack socket acts to collimate said light output from the light source to be sensed by the photo detector; and
    a processor arranged to process a signal that is based on said detected light and is received from the photo detector, and arranged to generate from said signal a function control signal for controlling a function in dependence on the detected light.

2. A mobile device according to claim 1, comprising a transmitter operable to transmit the function control signal to an external device for controlling the light source.

3. A mobile device according to claim 1, wherein the processor is arranged to decode the signal that is based on the detected light, the signal that is based on the detected light providing an identifier of the light source.

4. A mobile device according to claim 1, comprising a display operable to display to the user information about the detected light responsive to the function control signal.

5. A mobile device according to claim 4, wherein said information includes at least one of:
    a luminance measurement; or
    data associated with the light source.

6. A mobile device according claim 1, wherein the photo detector is operable to detect infrared light.

7. A mobile device according to claim 1, wherein the photo detector is operable to detect visible light.

8. A mobile device according to claim 1, comprising auxiliary collimating optics in the audio jack socket to further collimate the light output from the light source.

9. A mobile device according to claim 1, comprising one or more annularly disposed light guides in the audio jack socket for gathering light collimated by the socket and connected to guide the gathered light to the photo detector.

10. A mobile device according to claim 9, wherein one of the one or more annularly disposed light guides is a circular guide located in a circumference of the audio jack socket, wherein the circular guide is a continuously circular guide or a segmented circular guide.

11. A mobile device according to claim 9, wherein the one or more annularly disposed light guides includes a plurality of annularly disposed light guides that are arranged at different depths along a longitudinal axis of the audio jack socket.

12. A mobile device according to claim 1, comprising a data acquisitor which is arranged to acquire and store data about the light source from which light has been detected.

13. A light sensing system comprising the mobile device and the light source of claim 1, wherein the light source is disposed outside of the audio jack socket.

14. The light sensing system of claim 13, wherein the audio jack socket receives said light output from the light source directly from said light source.

15. A mobile device, for detecting light from a light source external to the mobile device, comprising:
    an audio jack socket configured to receive an audio output component for providing an audio signal generated in the mobile device to a user through an audio jack plug inserted in the audio jack socket;
    a photo detector arranged in the audio jack socket to detect light when the audio jack socket is not connected to an audio jack plug, whereby the audio jack socket acts to collimate received light from the light source to be sensed by the photo detector; and
    a processor arranged to process a signal received from the photo detector and to generate from the signal a function control signal for controlling a function in dependence on the received light, wherein a plurality of arcuate light guides are arranged annularly around a same circumference of the audio jack socket to provide different non-overlapping fields of view, wherein each arcuate light guide is coupled to a respective photo diode of the photo detector.

* * * * *